United States Patent [19]

Weis

[11] Patent Number: 5,675,674
[45] Date of Patent: Oct. 7, 1997

[54] OPTICAL FIBER MODULATION AND DEMODULATION SYSTEM

[75] Inventor: R. Stephens Weis, Fort Worth, Tex.

[73] Assignee: RockBit International, Ft. Worth, Tex.

[21] Appl. No.: 518,635

[22] Filed: Aug. 24, 1995

[51] Int. Cl.$^6$ .................................................. G02F 2/00
[52] U.S. Cl. .................... 385/12; 385/37; 385/1; 385/4; 250/227.18; 356/32
[58] Field of Search ................................. 385/12, 37, 1, 385/4, 10, 13, 14, 32, 45; 250/227.18, 227.15, 227.16; 356/32

[56] References Cited

U.S. PATENT DOCUMENTS 4,761,073  8/1988  Meltz et al. ............................ 356/32
4,996,419  2/1991  Morey .............................. 250/227.18

Primary Examiner—Phan T. H. Palmer
Attorney, Agent, or Firm—Gunn & Associates, P.C.

[57] ABSTRACT

This invention is directed toward a fiber optic modulation and demodulation system, and more particularly directed toward a telemetry system for relaying signals from sensors in remote, harsh environments. Light is modulated using one or more optical reflective grating and piezoelectric crystal combinations, and demodulated using an interferometer system. The one or more modulators are driven by the responses of one or more sensors thereby modulating one or more carrier wavelengths of a carrier light source. The modulated light signal is transmitted from the sensor or sensors, over an optical fiber, to an interferometer which is used to demodulate the reflected signals and thereby determine the responses of one or more sensors. One embodiment of the invention set forth is that of a telemetry system linking sensors within a borehole to detection and processing equipment at the surface of the earth.

50 Claims, 5 Drawing Sheets

OPTICAL FIBER MODULATION AND DEMODULATION SYSTEM

FIELD OF THE INVENTION

This invention is directed toward a fiber optic modulation and demodulation system, and more particularly directed toward a telemetry system for relaying signals from sensors in remote, harsh environments. Light is modulated using one or more optical reflective grating and piezoelectric crystal combinations, and demodulated using an interferometer system. The one or more modulators are driven by the responses of one or more sensors thereby modulating one or more carrier wavelengths of a carrier light source. The modulated light signal is transmitted from the sensor or sensors, over an optical fiber, to an interferometer which is used to demodulate the reflected signals and thereby determine the responses of one or more sensors.

BACKGROUND OF THE INVENTION

Telemetry is a key element in any communication, sensor, or data transmission system. Simply stated, the design criteria of most telemetry systems are (a) the maximization of the amount of information or "data" that can be transmitted per unit time and (b) the minimization of attenuation of the transmitted data thereby minimizing power requirements for the transmitter element of the system. Additional design criteria include reliability, physical size, and costs to manufacture, maintain and operate.

Almost any type of communication, control, and sensor system uses some form of telemetry. Amplitude and frequency modulation of electromagnetic carrier radiation are the backbone of the communications industry. Numerous wireless and "hard wired" systems are used as telemetry links between devices such as remote control devices for door or gate openers and the control station from which control commands are initiated. Likewise, numerous wireless and hard wired telemetry systems are used to couple remote sensors such as electromagnetic, acoustic and nuclear sensing devices to equipment which controls the operation of these sensors, and which also converts the basic responses of these sensors into parameters of interest. Although almost endless in design and application, most telemetry systems share three basic elements: a modulator element, a demodulator element, and a telemetry link connecting the modulator and demodulator elements. The modulator converts the response of a sensor, or the output of a microphone, or the output of a television camera to some type of signal or data that can be transmitted over the telemetry communication link. The demodulator element receives the transmitted data and converts these data to the desired output which might be spoken words, or a video image, or a set of measurements in engineering units. The telemetry link can be an electromagnetic "wireless" link, or a "hard wired" link such as one or more electrical conductors, or one or more optical fibers.

Hard-Wired Systems

Attention is now directed toward sensor and telemetry systems modulators and demodulators which are connected by hard wired telemetry links. Hard wired telemetry links will be categorized as electrical conductors and optical fibers. In the most general terms, the rate at which data can be transmitter over an optical fiber exceeds the rate at which data can be transmitted over an electrical conductor. Optical fiber is, therefore, the medium of choice in this primary design criterion. Signal attenuation is highly dependent upon the design of the particular optical fiber and the particular electrical conductor or electrical cable. Both can be designed to minimize attenuation, but possibly at the expense other factors such as increased costs of the cable, and increased costs of the modulator and demodulator elements. In addition, system reliability must sometimes be compromised in order to minimize signal attenuation. In summary, the choice of electrical or optical fiber to minimize signal attenuation is strongly dependent upon the particular application of the telemetry system.

Fiber Optic System

Attention is further narrowed to fiber optic based telemetry systems. These systems have found widespread use in the communications industry in that the previously mentioned broadband characteristics are ideals suited for, as an example, telephone communications. The broadband properties of fiber optics telemetry is also ideally suited for remote sensor systems wherein one or more sensors or detectors produce large amounts of data which can not be effectively converted to the parameters of interest or "answers" by circuitry at the location of the sensors. One such example would be a nuclear spectrometer located within a high radiation field and simultaneously located within a small physical area. Spectrometers characteristically generate large amounts of data which must be reduced or processed to obtain possibly only one or two parameters of interest. If the voluminous "raw" data could be processed at the location of the sensor, transmission of the relatively sparse "answer" data to the user would not present a serious telemetry problem. It is usually not practical to locate the required processing equipment at the site of the sensor, therefore, in this example, the voluminous amount of "raw" data must be telemetered to a remote location over the fiber optic telemetry link. In light of the above comments, it is apparent that prior art telemetry systems have been directed toward very high data rate transmissions.

Another example of the use of optical fiber is as a telemetry link between sensors within a borehole, and processing and recording equipment located at the surface of the earth. Many borehole sensors, and especially those sensors designed to determine characteristics of formations penetrated by the borehole, generate copious amounts of raw data that must be processed to obtain the geological and geophysical parameters of interest. Borehole conditions are usually "hostile" in that physical dimensions are constrained, and pressures and temperatures are usually elevated. As a result, it is advantageous to telemeter raw sensor data to the surface of the earth for processing rather than attempting to design and maintain downhole processing equipment. Fiber optic cables for downhole borehole measurement or borehole "logging" devices have been available on a limited commercial basis for a number of years. As stated previously, the primary advantage of these logging systems is that a tremendous amount of raw sensor data can be telemetered to the surface for processing. Several methods have been used to convert sensor responses to a form suitable for optical fiber transmission. One technique involves the use of a downhole light source such as a laser or a light emitting diode (LED), with the intensity of the output being modulated electrically by the response of the sensor. The operation of a light source within the borehole environment, and the modulation of the light source, usually requires rather complex electronic circuitry which is difficult to control and maintain in the harsh borehole condition. Variations in the output of the carrier light source can be erroneously interpreted as a modulation of the light source by the system thereby inducing error. A second technique involves the transmission of light from a laser or LED at the surface of the earth, down one optical fiber to the downhole sensor assembly, modulating the intensity of this carrier light signal as a function of the response or responses of one or more sensors within the logging tool, and subsequently transmitting the modulated light signal to the surface over a second optical fiber for processing. Attenuation can be a problem in the required "round trip" path of the carrier light signal. Again, downhole modulators which convert normally electrical outputs from the downhole sensors into optical carrier modulators are quite complex and are often unreliable and unstable in the harsh borehole environment. As in the previously discussed method of carrier modulation, variations in the intensity of the light source can be erroneously interpreted as a modulation of the carrier light thereby inducing systematic telemetry error in the demodulation measurement. Furthermore, optical losses at connecting optical fibers and couplers, and especially intermittent losses, may likewise be interpreted as false modulations. If, however, the transmitted information is digital and more particularly is binary (i.e. off-on keying), such variations in the light source intensity generally do not induce systematic telemetry error.

For other applications, various techniques have been employed to modulate the wavelength rather than the intensity of the carrier or source light. No systems used in borehole measurements and telemetry are known to use wavelength modulation. Demodulation of the telemetered information is then extracted by means of a spectrometer or a monochrometer, or by a more simple demodulator involving a dispersive element coupled with an image array as will be referenced in subsequent discussion. These demodulation systems are, however, unattractive due to their bulk-optical nature, their size and lack of ruggedness, and their limited resolution capability. It should also be noted again that the above systems are directed toward the telemetering at a high rate.

1. Optical Fiber Gratings

K. O. Hill and colleagues (K. O. Hill et al., "Photosensitivity in Optical Fiber Waveguides: Application to Reflection Filter Fabrication", Appl. Phys Lett. 32, 1978, 647–649) first observed a photo-induced fiber grating in a germania-doped optical fiber in 1978. The next major advancement in grating technology was the formulation of a transverse exposure on the side of the optical fiber with an interference pattern formed with an intense UV laser source to produce the index modulation or phase grating in the fiber core (G. Meltz et al, "Formation of Bragg Gratings in Optical Fibers by a Transverse Holographic Method", Opt. Lett. 14, 1989, 823–825). The transverse approach allowed for the fabrication of gratings with essentially any spacing or Bragg resonance wavelength. Furthermore, the grating elements could be placed at any desired location along the fiber with different exposure lengths and with different beam profiles to control the Bragg resonance spectrum as will be discussed subsequently. These gratings are periodic modulations of the optical fiber core refractive index, and by themselves form a wave-length-selective reflector, or rejection filter. A review of the fabrication of fiber Bragg gratings is presented by Morey et al (William W. Morey, Gary A Ball and Gerald Meltz, "Photoinduced Bragg Gratings in Optical Fibers", Optical and Photonics News, February 1994).

2. Gratings in Optical Telemetry and Sensor Systems

Bragg grating technology has been used in modulation elements of several fiber optic based sensor systems. A. D. Kersey et al (A. D. Kersey, T. A. Berkoff and W. W. Morey, "Fiber-Grating Based Strain Sensor with Phase Sensitive Detection", 1st European Conference on Smart Structures and Materials, Glasgow, 1992, Session 2) developed a technique for the detection of dynamic strain induced wavelength shifts in fiber Bragg gratings, which is capable of very high resolution. The technique is based upon the use of an unbalanced-interferometer wavelength discriminator as the demodulation element. The interferometer transposes the wavelength shift of an input carrier light source, reflected from a strained fiber grating, into an interference pattern which, in turn, can be converted into an electrical signal indicative of phase shift. R. S. Weis et al (R. S. Weis, A. D. Kersey and T. A. Berkoff, "A Four-Element Fiber Grating Sensor Array with Phase-Sensitive Detection", IEEE Photonics Technology Letters, Vol. 6, No. 12, December 1994) developed a multiple element, time-division multiplexed, fiber grating strain sensor array. The wavelength shifts from a plurality of sensor driven gratings are converted to phase changes by routing the reflected optical signals through a nearly path balanced fiber Mach Zehnder (MZ) interferometer Additional Background References The following is a brief description of additional references related to fiber optic grating technology.

U.S Pat. Nos. 4,807,950, 5,028,105, 5,042,897, 5,218,651, 5,061,032 and 4,725,110 all disclose fiber optic devices (such as sensors, filters, polarizers and the like) which utilize one or more periodic gratings imbedded somewhere within the optical system. The optical properties of the gratings, and therefore the optical outputs of the systems, are varied by external sources of light which impinge or "shine" upon the gratings rather than sources of light which are coupled directly to the gratings by means of optical fibers.

U.S. Pat. No. 5,307,437 to Paul Facq et al teaches the use of two parallel fibers, each of which contains internal gratings. The two parallel fiber gratings interact optically and can be used as elements of a coupler, polarizer, selective extractor, light injector, and a sensor.

A fiber optic sensor is disclosed in U.S. Pat. No. 5,280,172 to Bin et al. The sensor is based upon a periodic grating which is written within an optical fiber. The grating material absorbs gas at a rate proportional to the gas concentration to which it is exposed. Optical characteristics are varied by the amount of gas absorbed and the teachings are primarily directed toward gas sensors. The spacing between grating elements is not varied.

U.S. Pat. No. 5,218,655 to Mizrahi describes a method for making periodic grating within optical fibers. A disclosed application includes a pumped radiation reflector used in a fiber optic communication system.

A two mode, elliptical core fiber sensor is disclosed in U.S Pat. No. 5,208,877 to Murphy et al. The fiber is strained during the writing of the grating thereby obtaining an optical grating which varies with the length of the sensor.

Two parallel optical fibers containing internal gratings are disclosed in U.S. Pat. No. 5,016,967 to Meltz et al. The fibers optically interact with one another depending upon their relative position. The interaction can be used as a basis for constructing a fiber optic sensor.

U.S. Pat. No. 5,048,913 to Glenn et al teaches the use of a grating embedded within an optical fiber as a basic element of an optical filter.

An optical sensor system is disclosed in U.S. Pat. No. 4,914,665 to Wayne V. Sorin which incorporates an external periodic grating that interacts with the evanescent field of a side polished fiber. The relative position of the divergent grating is moved, relative to other elements of the device, as a function of the magnitude of the sensed parameter. Since the grating is divergent, grating periodicity is varied as a function of the magnitude of the sensed parameters.

U.S. Pat. No. 4,761,073 to Meltz et al discloses a fiber optic based strain gauge which contains a periodic grating. The source light for this device is external in that it impinges upon the strain gauge by means of a lens system. The response of the gauge is likewise transmitted to the analysis means by means of a lens system and a beam splitter.

A variable optical fiber Bragg filter arrangement is disclosed in U.S. Pat. No. 5,007,705 to Morey et al. The Bragg grating is contained within an optical fiber as is varied in length in order to "tune" the frequency of light passing through the grating arrangement.

U.S. Pat. No. 4,950,883 to William H. Glenn discloses a multiple sensor, periodic grating based fiber optic system wherein the sensors are operated in series and are connected directly to the source of light and the analysis elements by optical fibers. Pairs of fiber Bragg gratings are used to form fiber Fabry-Perot cavities that are wavelength specific.

U.S. Pat. No. 4,996,419 to William W. Morey teaches the use of multiple Bragg grating based sensors, wherein the gratings are formed or "written" directly within an optical fiber. Parameters to be measured deform the grating thereby creating a unique optical signature from each grating based sensor assembly. The multiple sensors are operated in series over a single optical fiber. Signals from the multiple sensors are obtained by time multiplexing techniques Specifics involving the analysis of the time multiplexed data, such as the use of an unbalanced interferometer, are not taught.

SUMMARY OF BACKGROUND ART

Communication and sensor systems have employed optical fiber technology for a number of years. In general, it can be stated that these prior art systems are directed toward high data rate telemetry. Primary emphasis has been on fiber optic telemetry links between modulators driven by audio or video transmitters and demodulators which transform the transmitted signal or data into corresponding sound, pictures or measured parameters of interest. More recently, fiber optic technology has been used in the demodulation elements and more predominantly in modulation elements of fiber optic transmission systems. In particular, gratings such as Bragg gratings have been employed within optical fibers as pressure sensors, wherein strain deformation or "stretching" of the grating varies the wavelength of light reflected from the grating. This reflected light, in turn, is transmitted by optical fiber to a demodulation element which comprises a device such as an interferometer wherein the variation in wavelength is measured and subsequently transformed to a quantitative measure of strain. It would be very advantageous to measure other physical quantities using the previously described Bragg grating fiber optics technology in that the technology is rugged, reliable, relatively inexpensive to manufacture and to operate, and can be adapted to environments that are physically hostile. Such additional parameters might include the properties of electromagnetic fields, counting rates resulting from nuclear transport and decay, acoustic properties and the like.

BRIEF SUMMARY OF THE INVENTION

This invention is directed toward a fiber optic modulation and demodulation system, and more particularly directed toward a sensor telemetry system in which light is modulated using one or more Bragg gratings, each of which is affixed to a piezoelectric crystal (PZ), and subsequently demodulated using an interferometer system. The system is applicable to both telemetry and sensor embodiments although the preferred embodiments presented in this disclosure are directed toward sensor telemetry embodiments. Other embodiments will, however, also be set forth. Various embodiments of the invention are rugged, exhibit excellent measurement resolution, are operationally reliable, and are relatively inexpensive to manufacture and to operate. Furthermore, the invention is ideally suited for applications in which one or more sensors are positioned in hostile environments and the resulting basic or "raw" sensor responses are telemetered to a remote, less hostile environment for processing and interpretation. The system permits simultaneous wavelength division multiplexing, time division multiplexing, and frequency division multiplexing as will be detailed in subsequent discussions. Other novel features and embodiments of the invention will become apparent in the following summary and detailed disclosure.

In the most simple embodiment, the invention employs a broadband light source which is coupled to a single modulating grating-PZ crystal assembly by means of a first optical fiber or fiber optic cable. The light source can be an edge-emitting light emitting diode (LED), a superluminescent diode, or a superflorescent fiber source. A first optical fiber coupler is positioned between the broadband light source and the grating-PZ assembly of the modulation element. Light from the broadband source is transmitted by means of the first optical fiber to a Bragg grating of the grating-PZ assembly. Bragg gratings fabricated or "written" in preferably germanium doped silica fibers are particularly suited for this application for reasons which will be subsequently detailed. Upon striking the grating, a portion of the transmitted light within a very narrow frequency range is reflected back through the first optical fiber, through the first coupler, and then through a second optical fiber which intersects the first coupler. The second optical fiber is terminated at a demodulation element. The frequency, and therefore the wavelength, of the reflected light is a function of the periodicity of the Bragg grating as will be discussed in a following section. As mentioned previously, the grating-PZ assembly consists of preferably a Bragg grating affixed to a PZ crystal such that the grating is parallel to the primary axis of motion of the PZ crystal. The response from any type of sensor (e.g. nuclear, electromagnetic, acoustic, pressure, temperature, torque, strain etc.) is converted to an electrical signal which is applied to the piezoelectric crystal. In the preferred embodiment, the deformation of the crystal is a function of the magnitude of the electrical signal applied to the crystal which, in turn, is a function of the response of the sensor. As an example, if the sensor is a nuclear type gamma ray detector, the electrical output of the gamma ray detector is a function of count rate resulting from the gamma ray flux impinging upon the detector. This electrical output, when applied to the piezoelectrical crystal, deforms or perturbs the crystal and correspondingly "stretches" or perturbs the affixed Bragg grating. The wavelength of the reflected light is therefore shifted as a function of the degree of perturbation of the PZ crystal. Stated another way, the wavelength and corresponding frequency of reflected light, with no deforming electrical signal applied to the PZ crystal, can be thought of as a "carrier" wavelength for the grating-PZ modulator. When the PZ crystal is perturbed by the electrical signal from the detector response (in this example, count rate), the carrier wavelength is correspondingly modulated as a function of the count rate recorded by the detector. It is noted that other devices may be affixed to and used to perturb the Bragg grating as a function of sensor response. As an example, a magnetostrictive device affixed to the grating and cooperating with a sensor will perturb or deform the grating as a function of the sensor response.

After passing through the coupler, the modulated, reflected, narrow band light signals are transmitted to a demodulation element by means of a second optical fiber. The demodulation device quantitatively measures the shift in wavelength induced by the physical perturbation of the grating-PZ assembly resulting from the response of the sensor electrically attached thereto. The demodulation device is preferably an unbalanced Mach-Zehnder (MZ) interferometer, although other devices can be used as will be discussed subsequently. The narrow band light signal from the modulating grating-PZ assembly is split with a second fiber coupler at the terminus of the second fiber, and transmitted through the two optical branches of the MZ interferometer which are of differing lengths and are therefore "unbalanced". The light signals from both branches of the unbalanced MZ interferometer are then combined by means of a third fiber coupler. Since the branches of the MZ interferometer are unbalanced (i.e. have differing lengths), the narrow band light signals from the two branches exhibit constructive or destructive interference when combined or "mixed" at the third coupler to a degree depending upon (a) the difference in path length of the two branches of the interferometer and (b) the wavelength of the input light signal. Since the difference in path length of the interferometer is fixed by design, the degree of interference upon combination of the two paths is a function of the wavelength of the input signal. The observed degree of interference is, therefore, used to quantitatively determine the wavelength of the input light signal using well known methods of interferometry. Stated very simply and very briefly, if the interferometer path length difference and the wavelength of the input signal are such that phase difference between signals emerging from the two branches are one full wave length or an integer multiple thereof, then constructive interference will be observed and the intensity of the "mixed" light signal will be maximized. Conversely, if the interferometer path length difference and the wavelength of the input signal are such that phase difference between signals emerging from the two branches are one half wave length or an integer multiple thereof, then destructive interference will be observed and the intensity of the "mixed" light signal will be minimized. The observed continuum of intensities between maximum and minimum is, therefore, an indication of phase shift. The output of the MZ interferometer is carried by a third optical fiber which terminates preferably at a photodetector in which the optical output of the MZ interferometer is converted to a corresponding electrical signal. The magnitude of the electrical output is proportional to the optical output of the MZ interferometer which, in turn, is a function of the wavelength of the interferometer optical input signal which, in turn, is a function of the perturbation of the grating-PZ element of the demodulator which, in turn, is a function of the response of the sensor electrically connected to the piezoelectric crystal portion of the grating-PZ assembly. The electrical output can, therefore, be directly calibrated in response units of the detector portion of the system. Using the previous example of a nuclear gamma ray detector, the electrical output can be calibrated in units of gamma radiation count rate.

Other means can be used to measure shifts in modulated light signals. These include bulk optical filters, and matched receiving-sensing grating pairs where the receiving grating tracks the wavelength shift of the sensing grating. Fiber laser cavities whose lasing wavelengths are dependent on the Bragg grating characteristics is another alternate phase shift detection means. Fiber Fabry-Perot interferometers have also been used to quantitatively measure phase shifts of fiber grating devices. These means lack either the compactness, ruggedness, reliability, precision, accuracy (or combination thereof) of the preferred unbalanced MZ interferometer of the present invention. An extensive list of references of alternate devices is presented in the previously referenced Weis et al publication.

A plurality of grating-PZ modulation assemblies can be employed and joined to a single demodulator by means of a single optical fiber which can be embodied as a fiber optic cable to serve as a telemetry link between the sensors and the demodulator. Time division multiplexing, frequency division multiplexing, and wavelength division multiplexing techniques are key features of the invention and will be disclosed in a following section. This feature of the invention permits the use of a plurality of types of sensors, such as acoustic, pressure, temperature, electromagnetic, nuclear and the like, in a remote and hostile location such as a borehole, and also allows the basic responses or "raw data" from these sensors to be telemetered by means of an optical fiber to less hostile locations for processing and analysis. Telemetry rates are higher than those obtainable using present mud pulsing telemetry systems. The system also permits the use of a plurality of detectors of the same type or class but with differing geometric orientations.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Background Information

Figure 1:
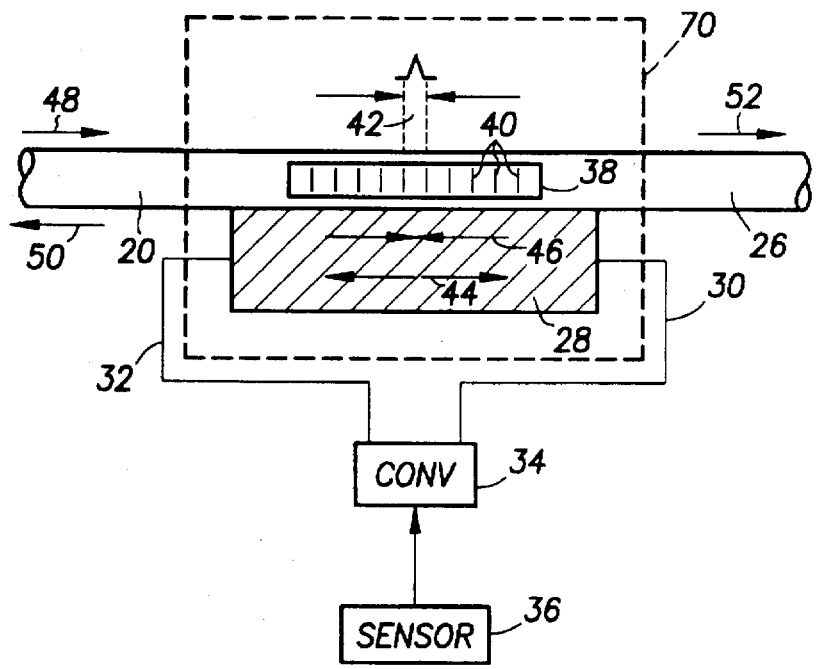
FIG. 1 is a conceptual illustration of a grating-piezoelectric crystal assembly.

FIG. 1 is a conceptualized depiction of the Bragg grating-PZ assembly and associated sensor systems. The Bragg grating 38 is a periodic modulation of the refractive index of the core of the optical fiber 20. The periodic modulation is externally formed or "written" in the optical fiber 20 with a period $\Lambda$, identified by the numeral 42. A piezoelectric crystal 28 is affixed to the portion of the fiber 20 which contains the grating 38 such that the direction of distortion or perturbation of the crystal, denoted by the arrows 44 and 46, is parallel to the grating vector 40. The grating vector 40 is perpendicular to the lines of constant refractive index. A suitable piezoelectric crystal would be a 30 millimeter (mm) long, 10 mm diameter, thin wall, lead zirconium titanate (PZT) transducer although other crystals and, in fact, other fiber distorting means can be used. For purposes of discussion, the portion of the fiber 20 containing the grating 38, and the piezoelectric crystal attached thereto, will be referred to as the "grating-PZ element" and will be denoted by the numeral 70. A sensor 36 generates an electrical signal which is passed to a conversion circuit 34. The conversion circuit conditions the output sensor signal such as to produce an electrical signal which is compatible with the electrical characteristics of the PZ crystal 28 and which is also a function of the response of the sensor 36 to the quantity being measured. This electrical signal is supplied to the PZ crystal 28 through electrical contact leads denoted by the numerals 30 and 32. The crystal 28 is elongated as indicated by arrows 44 or possibly compressed as indicated by arrows 46 depending upon the magnitude of the applied electrical signal. Being physically affixed to the PZ crystal 28, the grating 38 is likewise elongated or compressed and is in general perturbed to the same degree as the PZ crystal.

Still referring to FIG. 1, incident light, denoted by the arrow 48, from a broadband source (not shown in this FIG.) is transmitted through the optical fiber 20 into the grating 38. A portion of this broadband light, denoted by the arrow 52, passes through the grating 38 into that portion of the optical fiber shown on the right hand side of the grating-PZ element 70 and denoted by the numeral 26. A portion of the incident light 48 is reflected by the grating 38 and passes back through the optical fiber 20. This reflected light is denoted conceptually by the arrow 50. While the incident light 48 and the transmitted light 52 exhibit a very broadband of wavelengths, the reflected light component 50 exhibits a very narrow and well defined wavelength which is a function of the grating period $\Lambda$ denoted by the numeral 42. If no electrical signal is applied to the PZ crystal 28, the wavelength of the reflected light will be denoted as $\lambda_0$. If an electrical signal from the sensor assembly is applied to the PZ crystal 28, the physical dimension of the crystal will be perturbed, the grating will likewise be perturbed, and the grating period $\Lambda$ will change. The wavelength of the reflected light will then be $\lambda$, where $\lambda \neq \lambda_0$. The difference $\Delta\lambda = \lambda_0 - \lambda$ is therefore an indication of the magnitude of the electrical signal applied to the PZ crystal 28 which, in turn, is a direct function of the response of the sensor 36. Stated another way, a measure of the magnitude and algebraic sign of $\Delta\lambda$ is a measure of the response of the sensor 26.

It is again noted that means other than a piezoelectric crystal 28 can be used to deform the grating 38. One such alternate means is a magnetostrictive device (not shown) affixed to the fiber 20 adjacent to the grating 38. Again, the degree of deformation of the grating 38 by the magnetostrictive device is related to the electrical signal applied to the magnetostrictive device which, in turn, is related to the response a sensor which cooperates with the magnetostrictive device.

System Comprising A Single Grating-PZ Element

Figure 2:
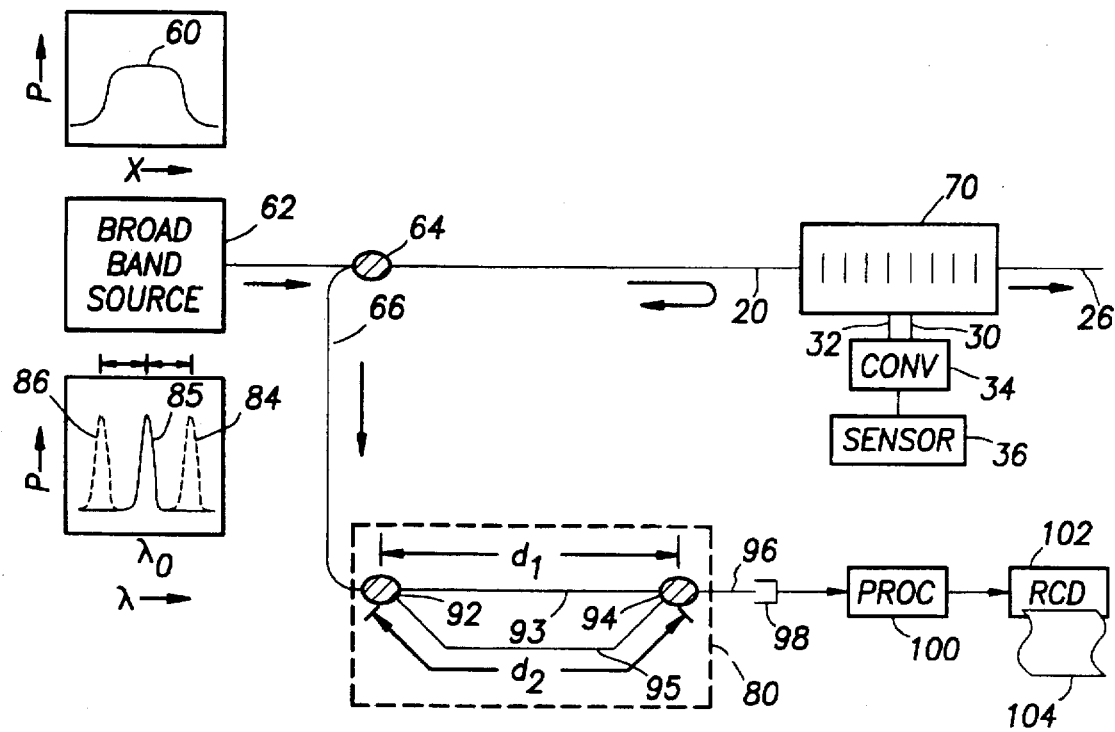
FIG. 2 depicts a fiber optic modulation, communication link and demodulation system using a single sensor and grating-piezoelectric crystal assembly and associated sensor.

Attention is now drawn to a simple embodiment of the invention wherein a single sensor and grating-PZ element is employed. A functional diagram of this embodiment is shown in FIG. 2. A light source 62 emits light into the system by means of the optical fiber 20. An example of a suitable light source 62 is a diode-pumped Er-doped fiber superfluorescent (EDFS) producing approximately 300 micro Watts ($\mu$W) of power with a 35 nanometer (nm) band width encompassing the wavelength range of 1530 to 1565 nm. Alternate broadband light sources 62 can be used as mentioned previously. A hypothetical output spectrum depicting optical power as a function of wavelength $\lambda$, is depicted by the curve 60. Light emitted by the source 62 and conveyed by the fiber 20 enters the grating-PZ assembly which is denoted as a single element by the numeral 70. As discussed previously, a portion of the light transmitted by the source is reflected by the Bragg grating 30 (see FIG. 1) and passes through the fiber 20 to a first optical coupler 64. Also as discussed previously, a portion of the light emitted from the source 62 passes through the grating-PZ element 70 and is transmitted along the portion of the optical fiber denoted by the numeral 26. For the example broadband light source specified, the grating-PZ element 70 consists of a Bragg grating of wavelength of approximately 1545 nm. Stated another way, the grating period $\Lambda$ (see FIG. 1) is such that light within a very narrow wavelength range centered about 1545 nm is reflected.

Figure 3:
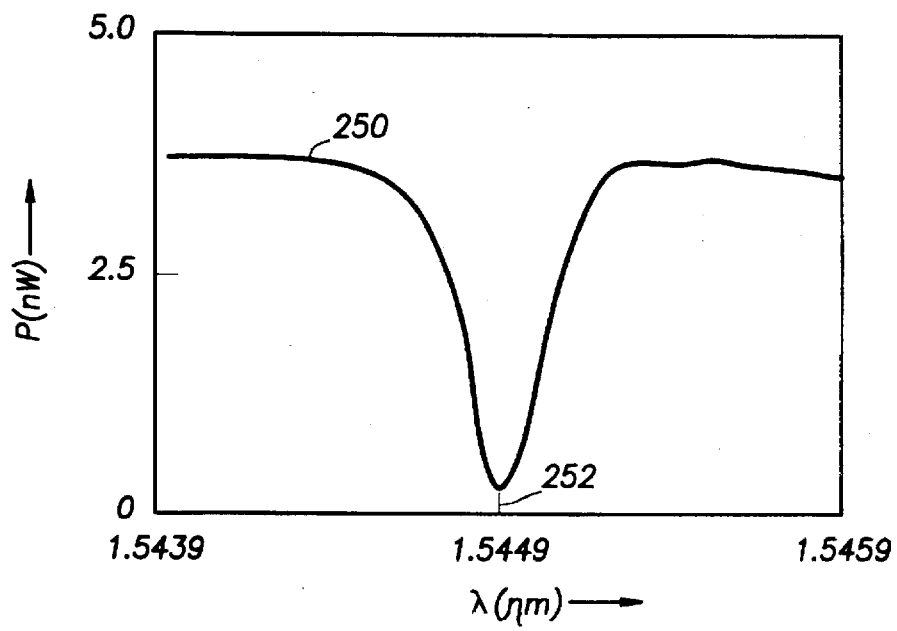
FIG. 3 illustrates a spectrum of light transmitted through a Bragg grating.

Referring to both FIG. 2 and FIG. 1, attention is concentrated on the modulation by the grating-PZ assembly 70. As stated previously, the PZ crystal component 28 of the grating-PZ element 70 is affixed to the grating 38 by means of an adhesive or other suitable bonding material. Connected to the input leads 32 and 30 of the PZ crystal is a conditioning circuit 34 which conditions the electrical output of the sensor 36 such that this output is compatible with the input requirements of the PZ crystal. If there is no output from the sensor, light will be reflected from the grating 38 at a characteristic wavelength $\lambda_0$ as described in the previous section and as illustrated by the peak 85 in the plot of reflected optical power P versus the wavelength $\lambda$ of the reflected light, as depicted in FIG. 2. FIG. 3 shows a power spectrum 250 of light transmitted through the grating-PZ element 70 as measured at that portion of the optical fiber denoted by the numeral 26 (see FIG. 2). A distinct and well resolved minima is shown in the curve 250 at the Bragg wavelength $\lambda_0 = 1545$ nm which indicates that this narrow band of light emitted by the broadband light source 62 is being reflected by the grating. When the sensor 36 responds to an external stimulus, the resulting electrical signal, conditioned by the conditioning circuit 34 and applied to the PZ crystal 28, perturbs the grating 38 and thereby varies the wavelength $\lambda$ of the reflected light. Reflections resulting from such perturbations are illustrated as peaks 86 and 84 in the plot of P versus $\lambda$ in FIG. 2. Using the present example, the carrier wavelength $\lambda_0 = 1545$ nm is therefore modulated by the grating-PZ element 70, and therefore by the response of the sensor 36, by an amount $\Delta\lambda = \lambda_0 - \lambda$. Defining the unit $\mu\epsilon$ as the strain induced in the grating of 1 part in $10^6$, the dependence of the reflected light wave upon grating strain is approximately 0.74 ppm/$\mu\epsilon$. For $\lambda_0 = 1545$ nm, a strain of 1 $\mu\epsilon$ will result in a wavelength shift $\Delta\lambda = 0.74 \times 10^{-6} \times 1545$ nm $= 1.5 \ 10^{-3}$ nm. In summary, the demodulation of this reflected light wave to determine $\lambda$ (or $\Delta\lambda$) is, therefore, a measure of the response of the sensor 36. It is apparent from the above examples that the resolution of the system is very great which, in turn, results in very precise and accurate measures of sensor responses.

Still referring to FIG. 2, attention is now directed to the transmission and demodulation of the light reflected from the grating-PZ element 70. Light reflected from the element 70 passes through the first optical fiber coupler 64 and through a second section of optical fiber 66 to a demodulation element denoted as a whole by the numeral 80. The demodulation element 80 is preferably a unbalanced Mach-Zehnder (MZ) interferometer. The demodulation function can alternately be provided by a spectrometer or monochrometer, or by a more simple arrangement involving a dispersive element coupled with an image array, such as a CCD detector array. These alternate systems are, however, unattractive due to their bulk-optical nature, size, lack of ruggedness, and limited resolution capacity for dynamic signals.

The major elements of an unbalanced MZ interferometer are depicted in FIG. 2. Light enters the interferometer 80 through a second fiber optic coupler 92 and is directed along the branches 93 and 95, and subsequently recombined at a third fiber optic coupler 94 for transmission to a photodiode 98 over a third optical fiber 96. The length of interferometer branch 93 is designated as $d_1$ and the length of interferometer branch 95 is designated as $d_2$, which is greater than $d_1$. The imbalance in the optical path difference (OPD) of the interferometer will be referred to as d and is defined as $d=d_2-d_1$. Constructive or destructive interference between light traveling paths 93 and 95 will occur when these light sources are combined at the third optical fiber coupler 94. The degree of interference is governed by well known principles of interferometry, and is a function of the wavelength $\lambda$ of the light entering the interferometer at coupler 92 and the magnitude of the OPD d. Again using $\lambda_o=1545$ nm as an example, for d=10 millimeters (mm), an index of refraction of the optical fiber of 1.46, and a strain responsivity of the grating 38 of 0.74 ppm/µε, the resulting phase shift for light emerging from the branches 93 and 95 of the interferometer will be 0.045 rad/µε. This high resolution dynamic phase detection capability achievable with the MZ interferometer coupled with the previously described phase shift responsiveness of the grating-PZ element gives a possible dynamic resolution of strain applied to the Bragg grating 38 by perturbations of the PZ crystal 28 of approximately 200 p ε/√Hz, where pε is defined as the unit picostrain. Stated another way, the fiber optic modulation and demodulation system as described is very responsive to the most subtle response of any type or class of sensor 36 driving the grating-PZ element 70. A more detailed mathematical description of the modulation and demodulation elements of the system will be presented in a subsequent section.

Still referring to FIG. 2, light output from the interferometer 80 is transmitted by the fiber optic cable 96 to a photodetector 98 wherein the optical response of the interferometer 80 is converted to an electrical signal for further processing in processor 100. Recalling again that the wavelength of the light reflected from the grating-PZ modulator 70 is (a) an indication of the response of the sensor 36 and (b) the wavelength of the reflected light is defined in the output of the MZ interferometer 80 as well known, variable intensity interference patterns, it follows that the electrical output of the photodetector 98 can be processed in processor 100 to obtain the response of the sensor 36. The quantification of the output of the MZ interferometer can be handled using several methods. More specifically, alternate techniques can be used to determine the wavelength of reflected light such as converting sepatately the outputs from each branch 93 and 95 of the MZ interferometer using the photodetector 98 and a second photodetector (not shown), and then processing these two electrical outputs in the processor 100. Using two photodetectors allows a better signal-to-noise ratio by canceling common mode noise and doubling the optical power detected.

Figure 5:
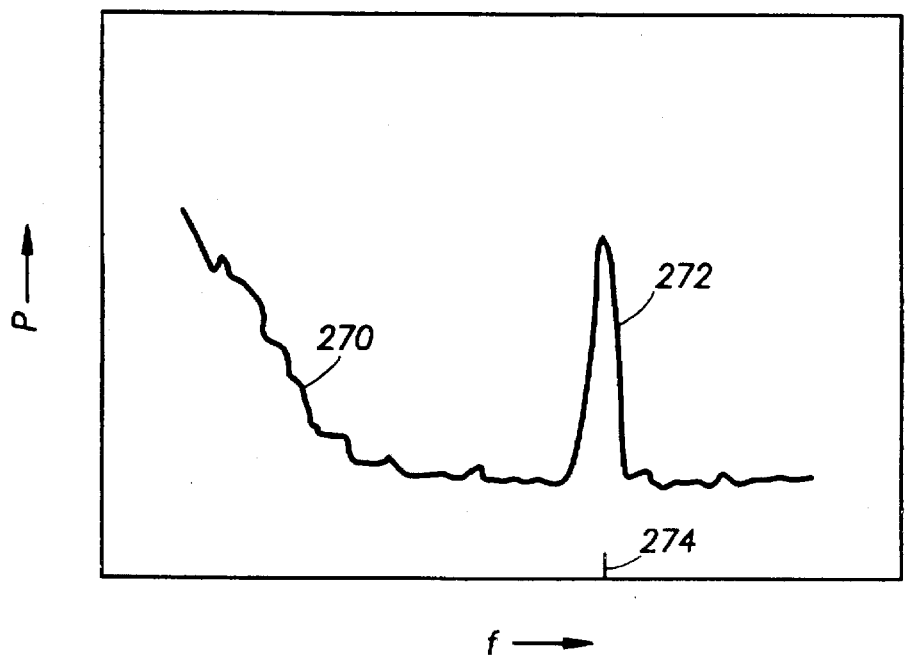
FIG. 5 shows the output of an unbalanced MZ interferometer in the form of a power spectrum.

In the preferred embodiment, the output of the MZ interferometer 80 is converted within the processor 100 into a power spectrum as depicted in FIG. 5. In FIG. 5, the power P related to the output intensity is plotted as a function of the frequency of light reflected from the grating-PZ element and input into the MZ interferometer 80. The curve 270 exhibits a sharp, well resolved peak at a frequency 274 which represents the frequency of the modulation of the wavelength $\lambda$. Subsequent processing within the processor 100, wherein induced phase shift is converted to sensor response using specific algorithms, will be presented in the following section. The output from the processor is the quantity of interest, namely, the response in engineering units of the sensor 36. As an example, if the sensor 36 is a gamma ray detector, the output of this detector response from the processor 100 will be a count rate. If the sensor 36 is a coil used to measure induced, alternating current electromagnetic fields, the output from processor might be the magnitude and frequency of the voltage induced within the coil sensor. Finally, sensor response is recorded as a function of time or possibly as a function of the physical position of the sensor within a recorder 102. Such a recorder may be a magnetic disk recorder, or optical disk recorder or any other recorder suitable to handle the output data generated by the system. Alternately, a "hard copy" 104 of the response of the sensor 36 can also be presented.

System Comprising A Multiple Grating-PZ Elements

As mentioned previously, grating-PZ elements, and sensors driving these elements, can be serially arranged along an optical fiber. This embodiment of the invention is advantageous when measurements based upon axially spaced sensors are used. As an example, a common measurement technique in borehole geophysics is the use of two neutron detectors with neutron detectors positioned at different axial spacings from a neutron source. Responses of the two detectors are combined to give an indication of the porosity of the formation penetrated by the borehole, with the combination of detector responses eliminating some of the adverse effects of the borehole itself upon the measurement of formation porosity. As a second example of the use of multiple sensors, again in borehole geophysics, a plurality of types of sensors are employed to measure a plurality of parameters of formation penetrated by the borehole, where the total number of parametric measurements, and the quality of the parametric measurements, is greater than the sum of measurements that could be obtained from an independent series of measurements with the different types of detectors. More specifically, previously mentioned neutron measurements are combined with responses from gamma ray sensors and acoustic wave sensors to ascertain the porosity, density and lithology of formation penetrated by the borehole.

Figure 4:
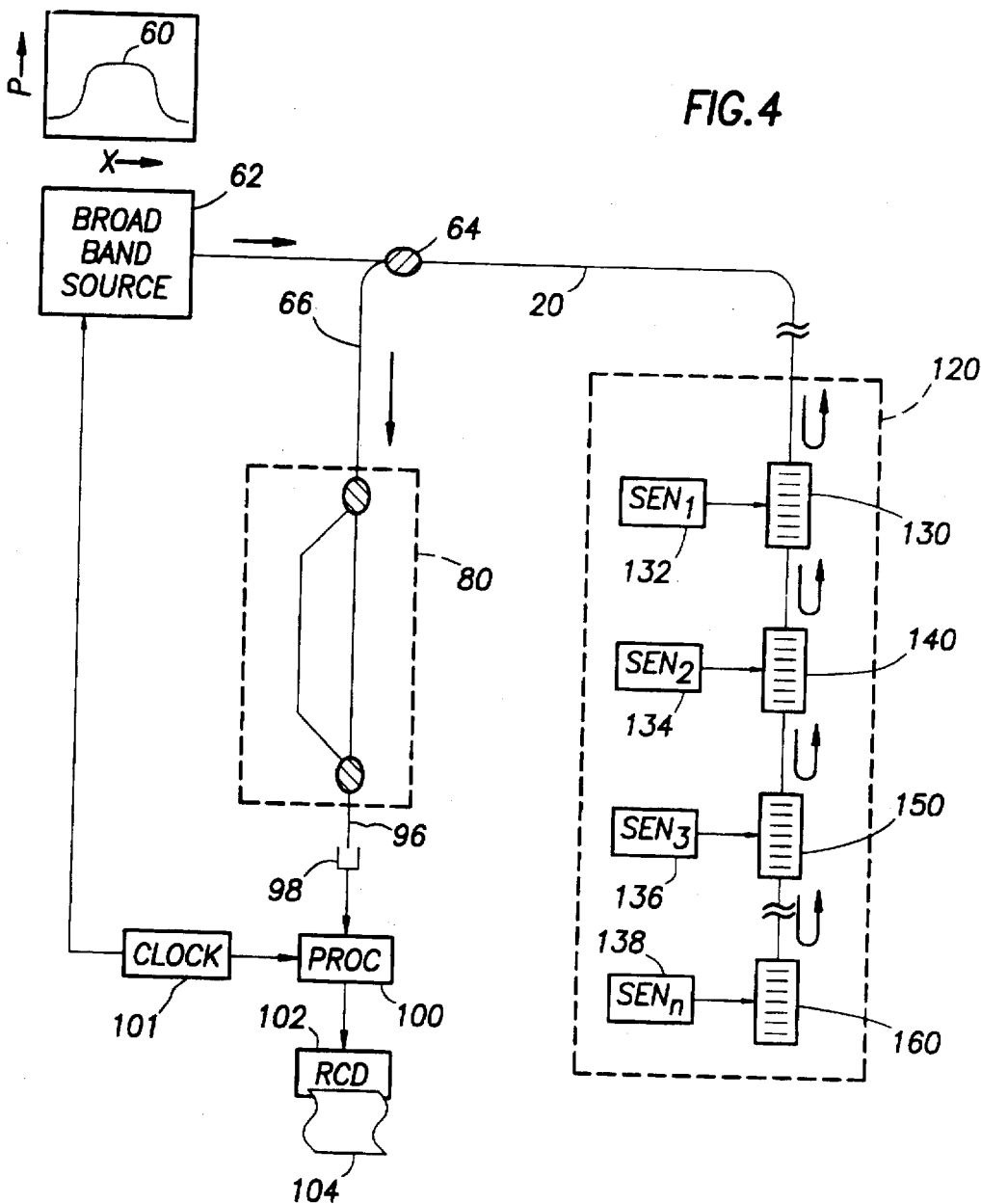
FIG. 4 depicts a fiber optic modulation, communication link and demodulation system using a plurality of grating-piezoelectric assemblies and associated sensors.

FIG. 4. illustrates a modulation-demodulation telemetry system, and sensors associated with n multiple grating-PZ elements. The first, second and third grating-PZ elements, denoted by the numerals 130, 140 and 150, are spaced serially along a common optical fiber cable 20. Sensors 132, 134 and 136 drive the grating-PZ elements 130, 140 and 150, respectively. Any number of sensor and corresponding grating-PZ elements can be included in the series, with the terminus element being designated as the "nth" element and denoted by the numeral 160. Sensor 138 drives the grating- PZ element 160. The grating-PZ elements and sensors as a group are considered as elements of a sensing device represented conceptually by the broken line box denoted as 120. As an example, the sensing device 120 might represent a multiple sensor borehole geophysical device as mentioned previously.

Still referring to FIG. 4, the n grating-PZ elements are illuminated using a spectrally broad band source 62. The emitted spectrum is illustrated by the curve 60 in the plot of output power versus wavelength $\lambda$. Each grating along the optical path 20 reflects a narrow band portion of the incident broad band light source with the remaining portion of the light being transmitted further down the optical fiber 20. As described in the single grating-PZ element system, the associated sensor response perturbs the affixed PZ crystal, changes the period of the Bragg grating, and thereby modulates the reflected optical signal within a narrow modulation range.

The use of n grating-PZ elements and associated sensors in a serial array requires that the employed telemetry system demodulate the responses generated by one or more of the "n" sensors. The invention can be embodied differently to utilize one or more features of the invention depending upon specific needs and applications. These various embodiments will be set forth in the following sections.

1. Wavelength Division Multiplexing

Figure 4A:
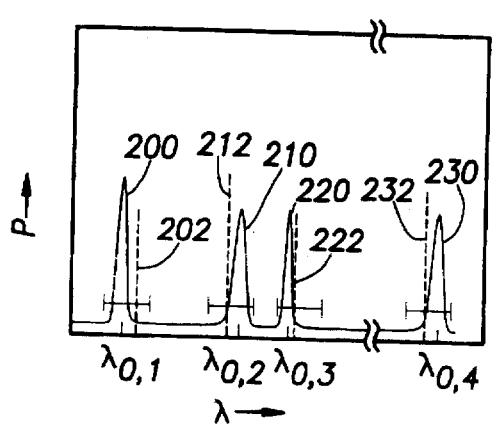
FIG. 4a shows a spectrum of reflected light as intensity as a function of wavelength.

Wavelength division multiplexed addressing of the plurality of grating-PZ elements is based on the inherent wavelength selectivity of the gratings. The spacings of grating periods of each Bragg grating are constructed or "written" to reflect light at a different wavelengths. Using previously defined notation, the grating of the first element 130 is written such that, when no response signal is supplied to the assembly from the sensor 132, light is reflected at a "carrier" wavelength of $\lambda_{o,1}$. Likewise, the gratings of the second element 140, the third element 150, and the nth element 160 are written such that the carrier wavelengths are $\lambda_{o,2}$, $\lambda_{o,3}$ and $\lambda_{o,n}$, respectively. As in the discussion of the single element system, each carrier wavelength is modulated within a narrow range such that the ranges of modulation do not overlap. With these design constraints, a spectrum of output power P versus reflected wavelength $\lambda$ is shown in FIG. 4a. Four ranges of carrier modulation are shown centered about the carrier wavelengths $\lambda_{o,1}$, $\lambda_{o,2}$, $\lambda_{o,3}$, and $\lambda_{o,n}$, with the range centers being denoted by the numerals 202, 212, 222 and 232, respectively. Each range of modulation corresponds to the four grating-PZ elements 130, 140, 150 and 160. Modulated wavelengths $\lambda_{o,1}$, $\lambda_{o,2}$, $\lambda_{o,3}$, and $\lambda_{o,n}$ are denoted by the numerals 200, 210, 220 and 230, respectively, where the subscripts correspond to the grating-PZ elements. The gratings 1, 2, 3, . . . , n are formed or written such that $\lambda_{o,1}$, $\lambda_{o,2}$, $\lambda_{o,3}$, . . . , $\lambda_{o,n}$ are close in value, but are also selected such that the modulation ranges of $\lambda_{o,1}$, $\lambda_{o,2}$, $\lambda_{o,3}$, . . . , $\lambda_{o,n}$ do not "overlap". Light consisting of a composite of components of wavelengths $\lambda_{o,1}$, $\lambda_{o,2}$, $\lambda_{o,3}$, . . . , $\lambda_{o,n}$ are then transmitted to the MZ interferometer 80 by means of the optical fiber 66. Output from the MZ interferometer 80 is transmitted over a third fiber optic cable 96 to a photodetector 98 which converts the optical signal to a proportional electrical signal. This electrical signal is then input to a processor 100 for analysis. Constructive or destructive interference can occur in the MZ interferometer 80 from any of the components 1, 2, 3, . . . , n components of the input signal, and relative changes in the interference pattern can be observed by the MZ interferometer 80 and the associated processing electronics 100. The processing electronics 100, as embodied in the current invention, can not resolve the particular carrier wavelength $\lambda_{o,1}$, $\lambda_{o,2}$, $\lambda_{o,3}$, . . . , $\lambda_{o,n}$. Using only wavelength division multiplexing and the MZ interferometer 80, it is therefore not possible to determine from which sensor the observed response is originating. Although not assignable to a specific sensor, sensor response is then recorded by means of the recorder 102 and optionally output in the form of a hard copy tabulation 104.

2. Time Division Multiplexing

Figure 4B:
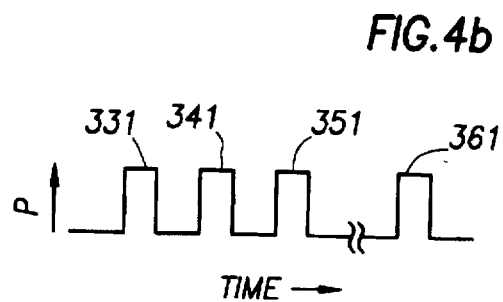
FIG. 4b illustrates a pulsing scheme a broad band light source.

A second method of multiplexing responses from the n grating-PZ elements is a time based method. Time addressing is accomplished by pulsing the broadband light source 62 under the control of a clock 101. Pulses of light from the source 62, as depicted conceptually in FIG. 4b by the square wave peaks 331, 341, 351 and 361 in the plot of emitted optical power P versus time t, are launched into the optical cable fiber 20 containing the n grating-PZ assemblies of differing Bragg wavelengths. These input pulse widths are equal to or less than the optical round trip time (i.e. transmission and reflection time) between any two grating-PZ elements. The grating-PZ elements 1, 2, 3, . . . , n (identified collectively in FIG. 4 by the numeral 120) are again written for wavelength division multiplexing as described in the previous section. That is, the gratings 1, 2, 3, . . . , n are written such that the reflected carrier wavelengths are again $\lambda_{o,1}$ $\lambda_{o,2}$, $\lambda_{o,3}$, . . . , $\lambda_{o,n}$. The return pulses reflected from this plurality of grating-PZ elements again comprises the wavelengths $\lambda_1$ $\lambda_2$, $\lambda_3$, . . ., $\lambda_n$. Contrary to the previously discussed demodulation technique using only wavelength division multiplexing, the signal input into the MZ interferometer 80 is not a composite of wavelengths $\lambda_1$ $\lambda_2$, $\lambda_3$, . . . , $\lambda_n$, but a sequential stream of pulses, separated in time, and wherein each pulse in the stream comprising a unique reflected wavelength $\lambda_j$ (j=1, 2, 3, . . . , n). Because of time division multiplexing, the sensor and associated grating-PZ element generating the reflected wave can be identified. Constructive or destructive interferences of each reflected pulse is developed within the unbalanced MZ interferometer 80 as previously discussed, and then output to a photodetector 98. The photo detector 98 converts the optical interference patterns from each grating to corresponding electrical signals which are input into the processor 100. Under the control of the clock 101, the output of the MZ interferometer is time-gated to address sequentially reflections from specific grating-PZ elements in the array assembly 120 and thus identify the sensor within the array generating the response. Stated another way, output from the MZ interferometer during a measured time interval can be attributed to interference patterns from a specific grating on the n grating array, because of the previously described sequential pulsing of the broad band light source 62. As a result, the sensor output driving that specific grating PZ element can be determined by processing techniques described in the discussion of a single element system. Typical parameters for a four grating-PZ element system with the elements spaced 5.0 m apart would comprise a broadband source 62 emitting light with a center wavelength of 1306 nm, a full-width-half-maximum (FWHM) of 24 nm, a rated output of 150 $\mu$W and 52 mA input current. The source 62 is pulsed with 50 nsec pulses and a ⅕ duty cycle. The gratings have center wavelengths $\lambda_{o,i}$ (where i=1, . . . ,4) between 1280 and 1310 nm, peak power reflectivities of 60 to 99%, and spectral band widths (FWHM) of 0.3 to 0.5 nm.

3. Frequency Division Multiplexing

Frequency division multiplexing is used to exploit the telemetry capabilities of the present invention, while the previously discussed wavelength division multiplexing and combination wavelength and time division multiplexing techniques exploited the sensor capabilities of the invention.

Figure 6:
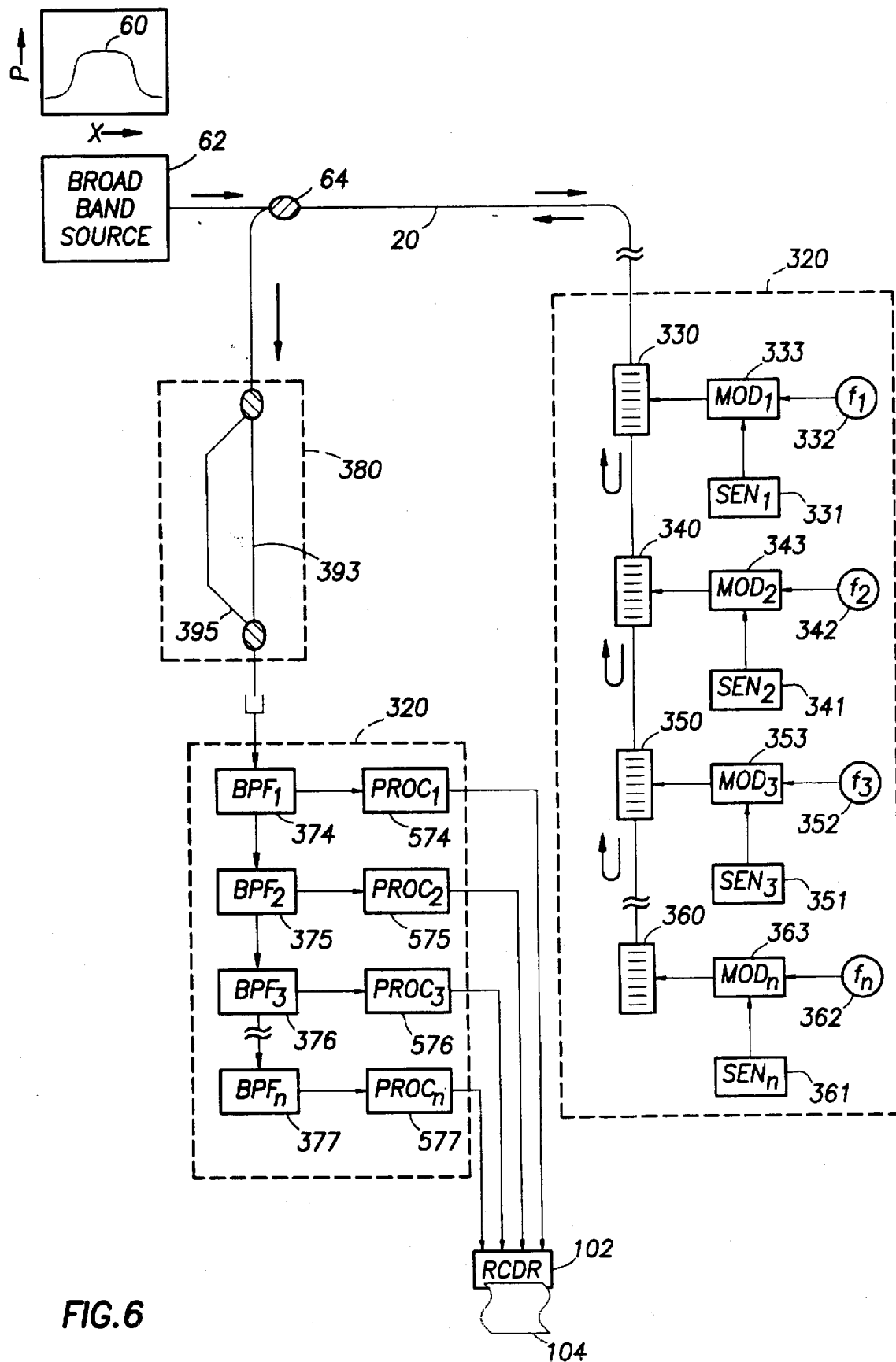
FIG. 6 depicts a fiber optic telemetry system based upon frequency division multiplexing.

Attention is directed toward FIG. 6. Grating-PZ elements 1, 2, 3, ..., n are denoted by the numerals 330, 340, 350 and 360, respectively. As in previously described systems, the gratings are wavelength division multiplexed. The sensors 331,341,351, and 361 modulate sinusoidal carrier frequencies $f_{o,1}$, $f_{o,2}$, $f_{o,3}$, ..., $f_{o,n}$, respectively, generated by the oscillators 332, 342, 352, and 362, respectively. The modulators 333, 343, 353 and 363 cooperate with grating-PZ elements 330, 340, 350 and 360, respectively. The plurality of "n" grating-PZ/modulator/oscillator/sensor assemblies are denoted as a whole by the numeral 320. The modulation accomplished by the modulators 333, 343, 353, and 363 can be one of many forms such as "on-off" keying, frequency shift keying, and phase shift keying. For example, on-off keying can be accomplished in the following manner: if the output of sensor 331 is digital, modulator 333 can be a voltage controlled switch that is opened or closed depending upon the digital state of the sensor 331.

Light reflected from the gratings over the optical fiber 20 is modulated at frequencies $f_j = F(f_{o,j}, \Delta_j)$ (j=1, 2, 3, ..., n) where $F(f_{o,j}, \Delta_j)$ is some function of $f_{o,j}$ and $\Delta_j$, and where $\Delta_j$ is defined as the perturbation of the carrier frequency resulting from the response of the sensor "j". The reflected light then enters a MZ interferometer denoted as a whole by the numeral 380 and comprising unbalanced arms 393 and 391. The optical MZ output is transmitted to the photoreceiver 98 by means of the optical fiber 96. The electrical output of the photoreceiver 98 is then transmitted to bandpass filters 374, 375, 376, and 377. The filters are set to select frequencies centered about the sinusoidal carrier frequencies $f_{o,1}$, $f_{o,2}$, $f_{o,3}$, ..., $f_{o,n}$ which, as an example, can be selected to be 15, 17, 19, and 21 KHz for a four sensor system. The output of the bandpass filters are then transmitted to the processors 574, 575, 576 and 577 wherein corresponding sensor responses are computed. Results are the recorded using the recorder 102 and optionally displayed in hard copy form 104.

As previously mentioned, the modulation of the sinusoidal carrier frequencies $f_{o,1}$, $f_{o,2}$, $f_{o,3}$, ..., $f_{o,n}$ can be accomplished using a plurality of techniques. As an example, one of the simplest ways to frequency division multiplex digital data from the sensors is on-off keying of the multiple carrier frequencies. Using the above terminology, $F(f_{o,j}, \Delta_j) = f_{o,j} \times \Delta_j$, where $\Delta_j$ is either =1 or =0. An output at the bandpass filter 374 at a frequency $f_{o,j}$ signifies that $\Delta_j$="1", while no observed output at a frequency $f_{o,j}$ signifies that $\Delta_j$="0". Other implementations of frequency division multiplexing are possible such as frequency-shift-keying and phase-shift-keying. As an example of the former, and again using the above terminology, $F(f_{o,j}, \Delta f_j) = f_{o,j} + \Delta f_j$, where $\Delta f_j$ is a shift in the carrier frequency resulting from additional deformation of the grating due to the electrical response of the sensor j being applied to the grating element in addition to the sinusoidal carrier frequency $f_{o,j}$. The frequency $F(f_{o,j}, \Delta f_j)$ is determined by adjusting the bandpass filter 374. Once $F(f_{o,j}, \Delta f_j)$ has been determined, the desired quantity $\Delta f_j$ can be determined since f0,j is known. More specifically, if the output of sensor "q" is digital, then $F(f_{o,q}, \Delta f_q) = f_{o,q}$ can be set to represent a digital "0" and $F(f_{o,q}, \Delta f_q) = f_{o,q} + \Delta f_q$ can be set to represent the digital "1".

Mathematical Formalism and Example

The mathematical formalism for the system will be developed using the single element grating-PZ and sensor system depicted in FIG. 2. It should be understood that the formalism can be expanded to the disclosed multielement systems.

The phase shift ($\Delta \Psi$) corresponding to a given wavelength shift of light input to an unbalanced MZ interferometer is the product of the shift in wave number of the source ($\Delta k_o$) and the previously defined optical path difference (OPD) between the two arms of the interferometer. Stated mathematically, $$\Delta \Psi = \Delta k_o (ODP) \tag{1}$$

The optical path difference of the MZ interferometer is equal to the product of the refractive index of the fiber core (n) and the difference in the lengths of the interferometer arms (d). That is, $$ODP = nd \tag{2}$$

Since $k_o \equiv (2\pi/\lambda_o)$, then $$\Delta k_o = -(2\pi/\lambda_o)(\Delta\lambda/\lambda_o) = -k_o(\Delta\lambda/\lambda_o) \tag{3}$$

Substituting equations (2) and (3) into equation (1) yields $$\Delta \Psi = -k_o nd(\Delta\lambda/\lambda_o) \tag{4}$$

Assuming the signal vs applied to the grating-piezoelectric element is sinusoidal, then $$V_s = V_a \sin(\omega_a t) \tag{5}$$

The resulting strain, $\Delta\epsilon_a$, is directly proportional to the applied signal, therefore $$\Delta\epsilon_a = DV_a \sin(\omega_a t) \tag{6}$$

where D is a constant depending on the piezoelectric element's piezoelectric coefficients and the piezoelectric element geometry. The resultant fractional wavelength change, $\Delta\lambda/\lambda_o$, is $$\Delta\lambda/\lambda_o = \zeta(\Delta\epsilon_a) \tag{7}$$

where $\zeta = (1/\lambda_o)(\delta\lambda/\delta\epsilon)$ is the normalized strain-to-wavelength-shift responsivity of the fiber Bragg grating. The term $\zeta$ is a constant determined by the elastic and photoelastic properties of the fiber.

Substituting equations (6) and (7) into equation (4) yields $$\Delta \Psi = -k_o nd\zeta V_a \sin(\omega_a t) \tag{8}$$

Thus, the phase of the detected signal is directly proportional to the voltage signal applied to the grating-crystal modulating element.

For a path imbalance I =1 mm, refractive index n =1.46, normalized strain responsivity $\zeta$=0.74, and a freespace wavelength $\lambda_o$=1300 nm yields a phase shift responsivity $\Delta\Psi/\Delta\epsilon$=5.2 mrad/µε where µε=microstrain. For a 30 mm long, 10 mm diameter, thin-wall, lead zirconium titanate piezoelectric transducer, D =0.53 µε/V. Thus, for an applied voltage of 5 $V_{pp}$ (TTL logic levels), $\Delta\epsilon$=2.65µε$_{pp}$. Substituting these values into equation (8), $\Delta\Psi_{pp}$=14 mrad. Interferemetric systems are capable of high dynamic phase shift detection, typically 1 µrad/√Hz. For a 100 kHz signal bandwidth, this gives a signal-to-noise ratio greater than 30 dB.

The foregoing example of the response of a single PZ-grating element is presented only as an example. It should be understood that the general formalism can be equally well applied to the responses of a plurality of PZ-grating elements.

Applications

As stated at the outset of this disclosure, the invention can be used in any situation in which an optical path can be established between the sensor-modulation section of the system and the demodulation-processing section of the system. Since the sensor-modulation section of the system is physically small, rugged, and contains essentially no moving parts, the system is ideally suited for measurements in hostile environments. Such hostile environments might include areas of high radiation such as locations near or within nuclear reactor, or borehole geophysics applications where physical dimensions are constrained by borehole dimensions, pressures, and temperatures (which are usually quite high in relatively deep boreholes such as oil and gas wells).

Focusing further on borehole geophysics applications, measurements of parameters of earth formations penetrated by a borehole have been made using borehole instruments conveyed by electrical conducting cables or "wirelines" since 1927. These wireline measurements are made after the borehole has been drilled. There are many advantages in making such measurements while the borehole is actually being drilled. The technology of "measurement-while-drilling" began to emerge commercially in the 1970s and today is comparable in quality and quantity with many more conventional wireline measurement systems. In both wireline and MWD systems, it is desirable to make a plurality of measurements simultaneously for reasons well known in the art and which were discussed briefly in an earlier section of this disclosure. The present invention is ideally suited for borehole geophysics applications in that it is designed for both hostile environments and for multiple sensor applications. In addition, fiber optic modulation and demodulation features allow tremendous amounts of data to be transmitted from the "downhole" sensors to the processing means at the surface of the earth. Wireline applications of the invention present no problems in that the optical fiber communication link can be contained within the wireline which supports, powers and conveys the downhole sensor array. In conventional MWD applications where the drill string comprises a series of threaded steel tubulars, the establishment of an optical path from a downhole sensor array in the vicinity of the drill bit to the surface of the earth presents somewhat of a problem.

Figure 7:
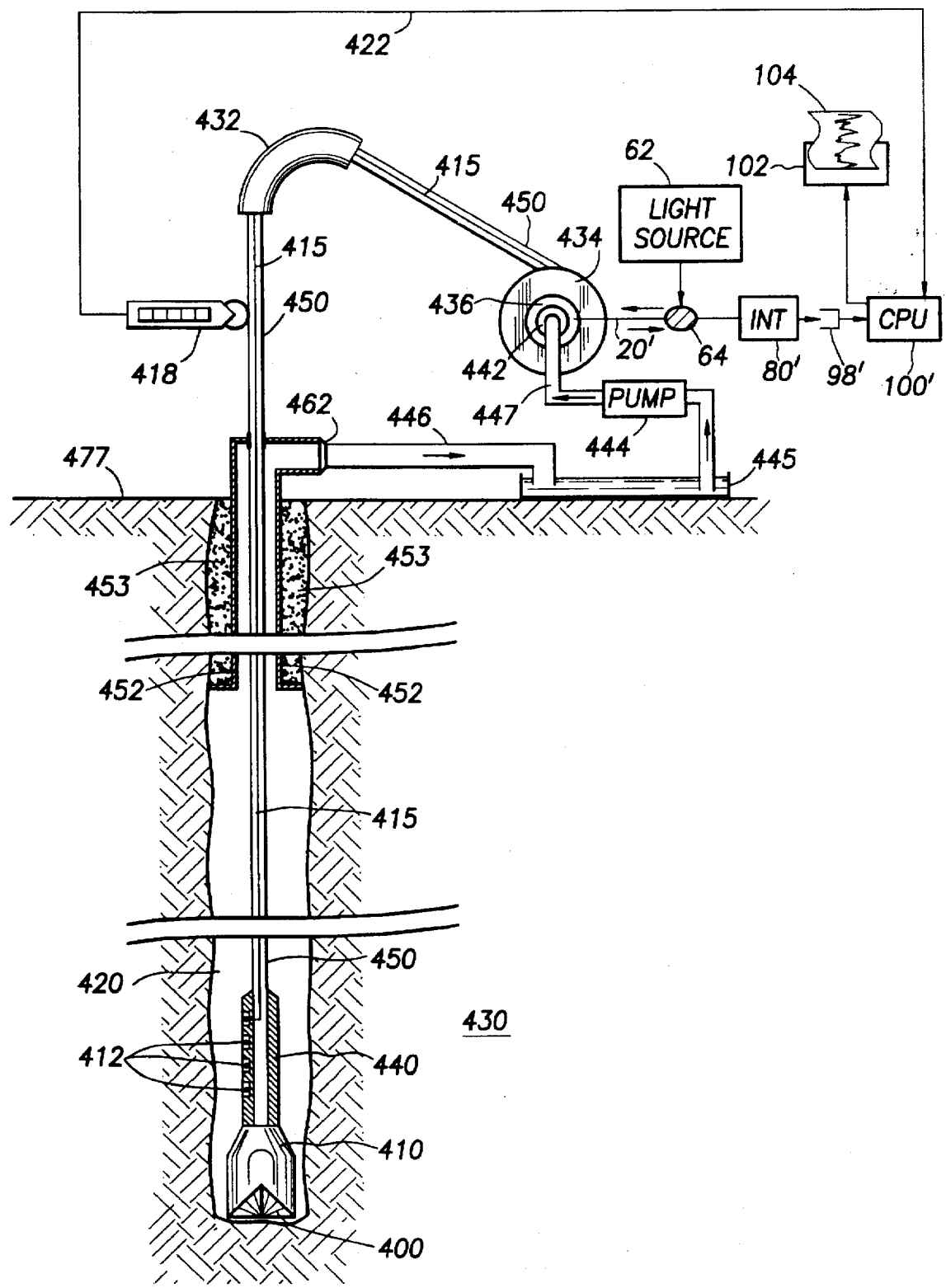
FIG. 7 depicts the invention embodied as a coiled tubing telemetry and sensor system.

Although elaborate alignment and coupling schemes for lengths of optical fibers contained within steel drill pipe have been proposed, perhaps the most promising application of the invention in MWD is in drilling operations using a single length of coiled tubing as depicted conceptually in FIG. 7. A drill bit 400 operated by a mud motor 410, is attached to a sensor package 440 which is tubular and contains one or more sensors 412 mounted within the wall. The sensor package is suspended within a borehole 420 penetrating earth formation 430 by a coiled tubing 450 which contains at least one optical fiber denoted by the numeral 415. Although the fiber 415 is shown centered within the coiled tubing 450 for clarity, it is preferred that the fiber be imbedded within the wall of the coiled tubing 450 during manufacture. The coiled tubing 450 is suspended within the borehole 420 by means of a tubing injector 432 positioned above the surface of the earth 477.

Still referring to FIG. 7, the coiled tubing 450 along with the drill bit 400, the mud motor 410, and the sensor package 440 mounted thereto, are conveyed in and out of the borehole 420 by means of draw works comprising a winch 434 about which the coiled tubing is partially coiled, and a motor (not shown) to drive the winch. Movement of the tubing 450 into and out of the borehole 420 is assisted and guided by the tubing injector 432 using methods and means well known in the art. Drilling fluid or drilling "mud" is pumped from a reservoir 445 by means of a mud pump 444, through conduit 447 through a swivel fitting 442, into the coiled tubing 450, and down through the sensor package 440 to the mud motor 410. The passage of the drilling mud through the mud motor rotates the bit 400 thereby extending the depth of the borehole 420. The flow of drilling mud exits the drill bit 400 and returns to the surface of the earth 477 by means of the annulus between the coiled tubing 450 and the borehole 420. Prior to reaching the surface of the earth 447, the mud flows into a surface casing 452 which is held in place and sealed to the earth formation 430 by a cement sheath 453. Once reaching the surface, the mud flow exits the surface casing 452 through a fitting 462 and returns to the mud reservoir 445 by means of conduit 446.

Referring now to both FIG. 1 and FIG. 7, attention is directed to the downhole terminus of the optical fiber 415 (denoted as 20 and 26 in FIG. 1) which contains one or more Bragg gratings 38 constructed therein along with an affixed piezoelectric crystal 28, conversion circuit 34 and sensor 36. If more than one sensor assembly is deployed within the sensor package 440, multiple sensors are coupled serially with a single optical fiber as depicted in the arrays 120 (FIG. 4) and 320 (FIG. 6).

Referring now to FIG. 7 along with FIGS. 4 and 6, the uphole terminus of the optical fiber 415 is optically coupled to an optical slip ring 436 in the winch 434. The output of the slip ring 436 is transmitted by means of an optical fiber cable 20' to a coupler 64. One branch of the coupler 64 receives light from the broadband light source 62, while the other branch transmits reflected light to an MZ interferometer 80'. The MZ interferometer 80° cooperates with the photodetector 98' as previously described thereby converting the optical output of the interferometer 80' into a corresponding electrical signals. These electrical signals are then input into a central processing unit (CPU) 100' which includes one or more processors, and alternately one or more bandpass filter and a clock. Outputs from the sensor package 440 are processed within the CPU 100' and the resulting sensor measurements are recorded by means of the recorder 102 and alternately are tabulated in hard copy form 104. Preferably, these measurements are recorded and tabulated as a function of depth within the borehole 420 at which they are measured. This is accomplished by means of a depth indicating device which senses the amount of coiled tubing 450 suspended within the borehole 420 and transmits this information to the CPU 100' preferably by means of an electrical conductor 422.

Alternate means can be used to transmit the optical signal from the rotating winch 434 to the processing and recording equipment positioned stationary at the surface of the earth. As an example, the light source 62, coupler 64, optical fiber 20, interferometer 80' and photodetector 98' can be mounted on the rotating winch 434 and be supplied with power from power supplies (not shown) trough a first set of electrical slip rings (not shown) mounted on the winch 434, The reflected light would be converted to a corresponding electrical signal by means of the photodetector 98', and this corresponding electrical signal would be transferred through a second set of electrical slip rings (not shown) to the CPU 100' for processing as previously described.

While the foregoing is directed to the preferred embodiment of the invention, the scope thereof is determined by the claims which follow.

What is claimed is:

1. A system for telemetering signals from sensors in a remote location, comprising:

(a) an elongated optical fiber;

(b) one or more Bragg gratings spaced longitudinally along and optically coupled with said elongated optical fiber in the vicinity of a first end of said elongated optical fiber;

(c) distortion devices with one distortion device being affixed to said elongated optical fiber at a location coincident with each said one or more Bragg gratings, and wherein each said one or more distortion devices responds to signals applied thereto and correspondingly perturbs the periodicity of each said coincident Bragg grating as a function of the magnitude of said applied signals;

(d) a broadband light source for launching light into a second end of said elongated optical fiber, and wherein a portion of said launched light is reflected by said one or more Bragg gratings back to said second end of said elongated optical fiber, and wherein the wave properties of said reflected light is a function of the periodicity of said one or more Bragg gratings;

(e) a detection system cooperating with said second end of said elongated optical fiber wherein said wave properties of said reflected light from said one or more of said Bragg gratings are determined; and (f) a processing system for relating said determined wave properties to the magnitudes of said signals applied to said one or more distortion devices.

2. The system of claim 1 comprising two or more Bragg gratings wherein each Bragg grating is formed with a different periodicity.

3. The system of claim 2 wherein said processor system comprises:

(a) a processor; and (b) a clock which cooperates with said light source and said processor to launch light from said light source in discrete bursts, and to time discriminate signals which are generated by said reflected light from said two or more Bragg gratings which are input into said processor thereby identifying the specific Bragg grating from which said reflected light is reflected.

4. The system of claim 2 wherein said processor system comprises two or more pairs of processors and band pass filters, wherein each processor-band pass filter pair cooperates with said photodetector to identify a specific Bragg grating from which said reflected light is reflected.

5. The system of claim 1 wherein each of said one or more distortion devices comprise piezoelectric crystals.

6. The system of claim 1 wherein said detection system comprises:

(a) an interferometer into which said reflected light is input;

(b) a photodetector which cooperates with said interferometer and converts the optical output of said interferometer to corresponding electrical signals;

(c) a processor system which cooperates with said photodetector and converts said electrical signals into measures of said signals applied to said one or more distortion devices; and (d) a recorder for recording said signals applied to said one or more distortion devices.

7. A system for telemetering signals from sensors located in a borehole, comprising:

(a) An elongated optical fiber with a first end located within said borehole and a second end located at the surface of the earth;

(b) a plurality of Bragg gratings with differing periodicities and spaced longitudinally within the core of said elongated optical fiber in the vicinity of said first end of said elongated optical fiber;

(c) a plurality of distortion devices wherein a single distortion device is affixed to said elongated optical fiber coincident with each Bragg grating thereby forming a plurality of longitudinally spaced distortion device-grating element;

(d) a plurality of sensors with a single sensor cooperating with each said distortion device-grating element such that the periodicity of each grating is varied as a function of the response of said cooperating sensor;

(e) a light source for launching sequential pulses of light into a second end of said elongated optical fiber, and wherein the bandwidth of said light source is sufficiently broad such that a portion of said launched light is reflected by each of said plurality Bragg gratings back to said second end of said elongated optical fiber, and wherein the wavelength of each component of said reflected light is a function of the periodicity of the Bragg grating reflecting that component;

(f) a detection system cooperating with said second end of said elongated optical fiber wherein said wavelength of each component of reflected light is determined, and the specific distortion device-grating element reflecting each said component of reflected light is determined; and (g) a processing system for relating said determined wavelength of each identified reflected light component to the response of the sensor which cooperates with the particular distortion device-grating element generating that reflected light component.

8. The system of claim 7 wherein said detection system comprises:

(a) an interferometer into which said reflected light is input;

(b) a photodetector which cooperates with said interferometer and converts the optical output of said interferometer to corresponding electrical signals;

(c) a processor which cooperates with said photodetector and converts said electrical signals input from said photodetector into measures of the responses of said plurality of sensors;

(e) a clock which cooperates with said pulsed light source and said processor thereby identifying the responding sensor; and (d) a recorder for recording said sensor responses.

9. The system of claim 8 wherein said photodetector comprises a photodiode.

10. The system of claim 8 wherein said interferometer comprises an unbalanced Mach-Zehnder interferometer.

11. The system of claim 8 wherein said sensor responses are recorded as a function of depth within the borehole at which they are determined.

12. The system of claim 7 wherein the time duration of said pulses of launched light is equal to or less than the sum of the time for transmitted light and reflected light to travel between any two distortion device-grating elements.

13. The system of claim 7 wherein each of said distortion devices comprise piezoelectric crystals.

14. The system of claim 7 wherein said light source comprises a diode-pumped Er-doped superfluorescent producing about 300 micro Watts of power with a 35 nanometer bandwidth encompassing a wavelength range of about 1530 nanometers to about 1565 nanometers.

15. A system for telemetering signals from sensors located in a borehole, comprising:

(a) an elongated optical fiber with a first end located within said borehole and a second end located at the surface of the earth;

(b) a plurality of Bragg gratings spaced longitudinally within the core of said elongated optical fiber in the vicinity of said first end of said elongated optical fiber;

(c) a plurality of distortion devices wherein a single distortion device is affixed to each said elongated optical fiber coincident with each Bragg grating thereby forming a plurality of longitudinally spaced distortion devicegrating elements;

(d) a plurality of modulation systems wherein a single modulation system cooperates with a single distortion device-grating element such that the periodicity of the Bragg grating of distortion device-grating element is modulated by the cooperating modulation system, and wherein each said modulation system further comprises (i) an oscillator which supplies a periodic carrier frequency to the distortion device-grating element with which it cooperates;

(ii) a modulator which modulates said carrier frequency based upon the response of a sensor with which said modulator cooperates;

(e) a light source for launching light into a second end of said elongated optical fiber, and wherein the bandwidth of said light source is sufficiently broad such that a portion of said launched light is reflected by each of said Bragg gratings back to said second end of said elongated optical fiber, and wherein the frequency of each component of said reflected light is a function of the modulated periodicity of the Bragg grating reflecting that component;

(f) a detection system cooperating with said second end of said elongated optical fiber wherein said frequency of each said component of reflected light is determined and the Bragg grating reflecting each said component of reflected light is determined; and (g) a processing system for relating said determined frequency of each identified reflected light component to the response of the sensor which cooperates with the particular modulation system of the distortion device-grating element generating that reflected light component.

16. The system of claim 15 wherein said detection system comprises:

(a) an interferometer into which said reflected light is input;

(b) a photodetector which cooperates with said interferometer and converts the optical output of said interferometer to corresponding electrical signals;

(c) a processing system which cooperates with said photodetector and converts said electrical signals into measures of the responses of said plurality of sensors; and (d) a recorder for recording said sensor responses.

17. The system of claim 16 wherein said photodetector comprises a photodiode.

18. The system of claim 16 wherein said processing system comprises:

(a) a plurality of bandpass filters wherein one bandpass filter encompassing the frequency range of each component of reflected light; and (b) a plurality of processors wherein one processor cooperates with one said bandpass filter.

19. The system of claim 16 wherein said interferometer comprises an unbalanced Mach-Zehnder interferometer.

20. The system of claim 15 wherein said sensor responses are recorded as a function of depth within the borehole at which they are determined.

21. The system of claim 15 wherein said distortion devices comprise a piezoelectric crystals.

22. The system of claim 15 wherein said light source comprises a diodepumped Er-doped superfluorescent producing about 300 micro Watts of power with a 35 nanometer bandwidth encompassing a wavelength range of about 1530 nanometers to about 1565 nanometers.

23. A method for telemetering signals from sensors in a remote location, comprising:

(a) providing an elongated optical fiber;

(b) providing one or more Bragg gratings spaced longitudinally along and optically coupled to said elongated optical fiber in the vicinity of a first end of said elongated optical fiber;

(c) affixing distortion devices to said elongated optical fiber wherein one distortion device is affixed to said elongated optical fiber coincident with each said one or more Bragg gratings, and wherein each said one or more distortion devices responds to signals applied thereto and correspondingly perturbs the periodicity of each said coincident Bragg grating as a function of the magnitude of said applied signals;

(d) launching broadband light into a second end of said elongated optical fiber, and wherein a portion of said launched light is reflected by said one or more Bragg gratings back to said second end of said elongated optical fiber, and wherein the wave properties of said reflected light is a function of the periodicity of said one or more Bragg gratings;

(e) at said second end of said elongated optical fiber, determining said wave properties of said reflected light from said one or more of said Bragg gratings; and (f) relating said determined wave properties to the magnitudes of said signals applied to said one or more distortion devices.

24. The method of claim 23 comprising two or more Bragg gratings wherein each Bragg grating is formed with a different periodicity.

25. The method of claim 24 wherein relating determined wave properties to the magnitudes of said signals applied to said two or more distortion devices further comprises:

(a) providing a process; and (b) providing a clock which (i) cooperates with said light source to launch light from said broad band source in discrete bursts, and (ii) cooperates with said processor to time discriminate signals which are generated by said reflected light from said plurality of Bragg gratings thereby identifying the specific Bragg grating from which said reflected light is reflected.

26. The method of claim 24 wherein relating determined wave properties to the magnitudes of said signals applied to said two or more distortion devices comprises providing two or more pairs of processors and band pass filters, wherein each processor-band pass filter pair is used to identify a specific Bragg grating from which said reflected light is reflected.

27. The method of claim 23 wherein each of said one or more distortion devices comprise a piezoelectric crystal.

28. The method of claim 23 wherein said detection of wave properties of reflected light further comprises:

(a) inputting said reflected light into an interferometer and obtaining an optical output therefrom;

(b) converting said optical output of said interferometer into electrical signals representative of said optical output;

(c) converting said electrical signals into measures of said signals applied to said one or more distorting devices; and (d) recording said signals applied to said one or more distortion devices.

29. A method for telemetering signals from sensors located in a borehole, comprising:

(a) providing an elongated optical fiber with a first end located within said borehole and a second end located at the surface of the earth;

(b) providing a plurality of Bragg gratings with differing periodicities and spaced longitudinally within the core of said elongated optical fiber in the vicinity of a first end of said elongated optical fiber;

(c) affixing a plurality of distortion devices to said elongated optical fiber, wherein a single distortion device is affixed to said elongated optical fiber coincident with each Bragg grating thereby forming a plurality of longitudinally spaced distortion device-grating elements;

(d) providing a plurality of sensors wherein a single sensor cooperates with a single distortion device-grating element such that the periodicity of the Bragg grating of each distortion device-grating element is varied as a function of the response of said cooperating sensor;

(e) launching from said light source, in the form of sequential pulses of light, into a second end of said elongated optical fiber, and wherein the bandwidth of said light source is sufficiently broad such that a portion of said launched light is reflected by each distortion device-grating element back to said second end of the elongated optical fiber, and wherein the wavelength of each component of said reflected light is a function of the periodicity of the Bragg grating of the distortion device-grating element reflecting that component;

(f) at said second end of said elongated optical fiber, determining said wavelength of each component of reflected light and determining each specific distortion devise-grating element reflecting each said component of reflected light; and (g) providing a processing system for relating said determined wavelength of each identified reflected light component to the response of the sensor which cooperates with the particular distortion device-grating element generating that reflected light component.

30. The method of claim 29 wherein the determination said wavelength of each said component of reflected light, and the identification of each specific distortion devise-grating element reflecting each said component of reflected light further comprises:

(a) providing an interferometer into which said reflected light is input;

(b) converting the optical output of said interferometer into corresponding electrical signals representing the magnitudes of said optical output;

(c) providing a processor which converts said electrical signals into measures of the responses of said plurality of sensors;

(e) providing a clock which cooperates with said pulsed light source and said processor to identify the responding sensor; and (d) recording said sensor responses.

31. The method of claim 30 wherein said interferometer comprises an unbalanced Mach-Zehnder interferometer.

32. The method of claim 30 wherein said sensor responses are recorded as a function of depth within the borehole at which they are determined.

33. The method of claim 29 wherein the time duration of said pulses of launched light is equal to or less than the sum of the time for transmitted light and reflected light to travel between any two distortion device-grating elements.

34. The method of claim 30 wherein said photodetector comprises a photodiode.

35. The method of claim 29 wherein said light source comprises a diode-pumped Er-doped superfluorescent producing about 300 micro Watts of power with a 35 nanometer bandwidth encompassing a wavelength range of about 1530 nanometers to about 1565 nanometers.

36. The method of claim 29 wherein each of said distortion devices comprise piezoelectric crystals.

37. A method for telemetering signals from sensors located in a borehole, comprising:

(a) providing an elongated optical fiber with a first end located within said borehole and a second end located at the surface of the earth;

(b) providing a plurality of Bragg gratings spaced longitudinally within the core of said elongated optical fiber in the vicinity of a first end of said elongated optical fiber;

(c) affixing a plurality of distortion devices to said elongated optical fiber, wherein a single distortion device is affixed to said elongated optical fiber coincident with each Bragg grating thereby forming a plurality of longitudinally spaced distortion device-grating elements;

(d) providing a plurality of modulation systems wherein a single modulation system cooperates with a single distortion device-grating element such that the periodicity of the Bragg grating of each distortion device-grating element is modulated, and wherein each said modulation system further comprises (i) an oscillator which supplies a periodic carrier frequency to the distortion device-grating element with which it cooperates;

(ii) a modulator which modulates said carrier frequency based upon the response of a sensor with which said modulator cooperates;

(e) launching light from a broad band light source into said second end of said elongated optical fiber, wherein the bandwidth of said light source is sufficiently broad such that a portion of said launched light is reflected by each of said distortion element-grating element back to said second end of the elongated optical fiber, and wherein the frequency of each component of said reflected light is a function of the modulated periodicity of the Bragg grating of the distortion device-grating element reflecting that component;

(f) at said second end of said elongated optical fiber, determining said frequency of each component of reflected light and the Bragg grating reflecting each said component of reflected light; and (g) providing a processing system for relating said determined frequency of each identified reflected light component to the response of the sensor which cooperates with the particular modulation system of the distortion device-grating element generating that reflected light component.

38. The method of claim 37 wherein said determination of said frequency of each component of reflected light, and the identification of the distortion devicegrating element reflecting each said component of reflected light further comprises:
   (a) imputing said reflected light into an interferometer and obtaining optical outputs;
   (b) converting said optical outputs to corresponding electrical signals indicative of the magnitude of said optical outputs;
   (c) converting said electrical signals into measures of the responses of said plurality of sensors; and
   (d) recording said sensor responses.

39. The method of claim 38 wherein said conversion of electrical signals into measures of the responses of said plurality of sensors further comprises:
   (a) providing a plurality of bandpass filters wherein one bandpass filter encompassing the frequency range of each component of reflected light; and
   (b) providing a plurality of processors wherein one processor cooperates with one band pass filter thereby frequency demodulating the component of reflected light of frequency encompassed by the band pass filter.

40. The method of claim 38 wherein said interferometer comprises an unbalanced Mach-Zehnder interferometer.

41. The method of claim 38 wherein said optical outputs of the interferometer are converted to corresponding electrical signals by means of a photodiode.

42. The method of claim 37 wherein said sensor responses are recorded as a function of depth within the borehole at which they are determined.

43. The method of claim 37 wherein said light source comprises a diode-pumped Er-doped superfluorescent producing about 300 micro Watts of power with a 35 nanometer bandwidth encompassing a wavelength range of about 1530 nanometers to about 1565 nanometers.

44. The method of claim 37 wherein said distortion devices comprise piezoelectric crystals.

45. A system for telemetering signals from sensors in a remote location, comprising:
   (a) an elongated optical fiber;
   (b) two or more Bragg gratings spaced longitudinally along and optically coupled with said elongated optical fiber in the vicinity of a first end of said elongated optical fiber, wherein each said Bragg grating is formed with a different periodicity;
   (c) distortion devices with one distortion device being affixed to said elongated optical fiber at a location coincident with each said two or more Bragg gratings, and wherein each of said two or more distortion devices responds to signals applied thereto and correspondingly perturbs the periodicity of each said coincident Bragg grating as a function of the magnitude of said applied signals, and wherein each of said two or more distortion devices comprise piezoelectric crystals;
   (d) a light source for launching light into a second end of said elongated optical fiber, and wherein a portion of said launched light is reflected by said two or more Bragg gratings back to said second end of said elongated optical fiber, and wherein the wave properties of said reflected light is a function of the periodicity of said two or more Bragg gratings;
   (e) a detection system cooperating with said second end of said elongated optical fiber, wherein said wave properties of said reflected light from said two or more of said Bragg gratings are determined, and wherein said detection system comprises
      (i) an interferometer into which said reflected light is input,
      (ii) a photodetector which cooperates with said interferometer and converts the optical output of said interferometer to corresponding electrical signals,
      (iii) a processor system which cooperates with said photodetector and converts said electrical signals into measures of said signals applied to said one or more distortion devices, and
      (iv) a recorder for recording said signals applied to said one or more distortion devices; and
   (f) a processing system for relating said determined wave properties to the magnitudes of said signals applied to said two or more distortion devices.

46. The system of claim 45 wherein said processor system comprises:
   (a) a processor; and
   (b) a clock which cooperates with said light source and said processor to launch light from said light source in discrete bursts, and to time discriminate signals which are generated by said reflected light from said two or more Bragg gratings which are input into said processor thereby identifying the specific Bragg grating from which said reflected light is reflected.

47. The system of claim 45 wherein said processor system comprises two or more pairs of processors and band pass filters, wherein each processor-band pass filter pair cooperates with said photodetector to identify a specific Bragg grating from which said reflected light is reflected.

48. A method for telemetering signals from sensors in a remote location, comprising:
   (a) providing an elongated optical fiber;
   (b) providing two or more Bragg gratings spaced longitudinally along and optically coupled to said elongated optical fiber in the vicinity of a first end of said elongated optical fiber, wherein each Bragg grating is formed with a different periodicity;
   (c) affixing distortion devices to said elongated optical fiber, wherein one distortion device is affixed to said elongated optical fiber coincident with each said two or more Bragg gratings, and wherein each said two or more distortion devices responds to signals applied thereto and correspondingly perturbs the periodicity of each said coincident Bragg grating as a function of the magnitude of said applied signals, and wherein each of said two or more distortion devices comprise a piezoelectric crystal;
   (d) launching light into a second end of said elongated optical fiber, and wherein a portion of said launched light is reflected by said two or more Bragg gratings back to said second end of said elongated optical fiber, and wherein the wave properties of said reflected light is a function of the periodicity of said two or more Bragg gratings;
   (e) at said second end of said elongated optical fiber, determining said wave properties of said reflected light from said two or more of said Bragg gratings, wherein said determination of wave properties of reflected light further comprises
      (i) inputting said reflected light into an interferometer and obtaining an optical output therefrom, (ii) converting said optical output of said interferometer into electrical signals representative of said optical output, (iii) converting said electrical signals into measures of said signals applied to said one or more distorting devices, and (iv) recording said signals applied to said one or more distortion devices; and (f) relating said determined wave properties to the magnitudes of said signals applied to said one or more distortion devices.

49. The method of claim 48 wherein relating determined wave properties to the magnitudes of said signals applied to said two or more distortion devices further comprises:

(a) providing a processor; and (b) providing a clock which (i) cooperates with said light source to launch light from said broad band source in discrete bursts, and (ii) cooperates with said processor to time discriminate signals which are generated by said reflected light from said plurality of Bragg gratings thereby identifying the specific Bragg grating from which said reflected light is reflected.

50. The method of claim 48 wherein relating determined wave properties to the magnitudes of said signals applied to said two or more distortion devices comprises providing two or more pairs of processors and band pass filters, wherein each processor-band pass filter pair is used to identify a specific Bragg grating from which said reflected light is reflected.

* * * * *